United States Patent
Lee et al.

(10) Patent No.: US 8,046,025 B2
(45) Date of Patent: Oct. 25, 2011

(54) DUAL MODE MOBILE HANDSET AND CALL PROCESSING METHOD THEREOF

(75) Inventors: Kwang Min Lee, Suwon-si (KR); Hee Suk Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 930 days.

(21) Appl. No.: 11/966,499

(22) Filed: Dec. 28, 2007

(65) Prior Publication Data

US 2008/0161042 A1    Jul. 3, 2008

(30) Foreign Application Priority Data

Dec. 28, 2006   (KR) .................. 10-2006-0136006

(51) Int. Cl.
*H04B 1/38* (2006.01)

(52) U.S. Cl. ............... 455/552.1; 455/553.1; 370/331; 370/342

(58) Field of Classification Search .............. None
See application file for complete search history.

(56) References Cited

U.S. PATENT DOCUMENTS

2005/0181822 A1* 8/2005 Sasaki et al. ............... 455/552.1

FOREIGN PATENT DOCUMENTS

| KR | 10-2005-0060073 | 7/2005 |
| KR | 10-2005-0071646 | 7/2005 |

* cited by examiner

*Primary Examiner* — Phuoc Doan
(74) *Attorney, Agent, or Firm* — The Farrell Law Firm, P.C.

(57) ABSTRACT

A dual mobile handset supporting CDMA and GSM communication and call processing method for the dual mode mobile handset, implemented to receive CDMA and GSM calls and process CDMA and GSM signals using different applications, thereby adaptively receiving the CDMA and GSM calls, are provided. The dual mode mobile handset includes first and second transceivers for receiving and transmitting first and second communication mode calls, respectively; first and second controllers for assigning first and second communication mode call identifiers to a call received through the first and second communication mode transceivers, respectively; a user interface module for activating one of call processing applications for the first and second communication mode calls on the basis of the call identifier assigned to the received call; and an inter-process communication module for matching one of the first and second controller to the user interface module.

14 Claims, 3 Drawing Sheets

DUAL MODE MOBILE HANDSET AND CALL PROCESSING METHOD THEREOF

PRIORITY

This application claims priority under 35 U.S.C. §119(a) to a Korean Patent Application entitled "DUAL MODE MOBILE HANDSET AND CALL PROCESSING METHOD THEREOF" filed in the Korean Intellectual Property Office on Dec. 28, 2006 and assigned Serial No. 2006-0136006, the contents of which are incorporated herein by reference.

BACKGROUND OF THE INVENTION

1. Field of the Invention

The present invention relates to a mobile handset and, in particular, to a dual mobile handset supporting Code Division Multiple Access (CDMA) and Global System for Mobile communication (GSM) and a call processing method for the dual mode mobile handset.

2. Description of the Related Art

The mobile communication systems are generally classified into two categories, i.e. an asynchronous GSM system, which is primarily used in Europe, and a synchronous CDMA system, which is primarily used in North America. The CDMA system is characterized in that a transmitter and a receiver are synchronized using a Global Positioning System (GPS).

The GSM system uses a combination of Frequency Division Multiple Access (FDMA) and Time Division Multiple Access as a multiple access method. GSM is the most popular standard for mobile communication in the world such that developments of GSM services are profitable.

CDMA system is a representative synchronous mobile communication system and uses a spread spectrum technology. The spread spectrum is advantageous in terms of increasing frequency reuse. Since CDMA cells use the same frequency band, soft handover is possible between the cells in addition to high frequency reuse efficiency. Also, CDMA uses code channels, which increases security and privacy protection.

The two communication standards use different frequency bands with different specifications such that a CDMA mobile handset and a GSM mobile handset are not compatible. That is, a CDMA mobile handset is useless in a GSM service area, and a GSM mobile handset cannot be used in a CDMA area.

Accordingly, when a person travels from a CDMA service area to a GSM service area and vice versa, the person must change his or her mobile handset or carry two types of mobile handsets.

In order to solve this problem, dual mode mobile handsets have been developed. Such conventional dual mode mobile handsets must be booted in one of the GSM and CDMA modes. However, in regions such as China and Brazil where both the CDMA and GSM networks are mingled, the conventional dual mode mobile handset is used as a single mode mobile handset only for the communication system selected by the user. That is, the conventional dual mode mobile handset cannot receive CDMA and GSM services at the same time.

SUMMARY OF THE INVENTION

The present invention has been made in an effort to solve the above problems, and it is an object of the present invention to provide a dual mode mobile handset that enables standby in both communication modes, and a call processing method for the dual mode phone.

It is another object of the present invention to provide a dual mode mobile handset capable of simultaneously operating in a CDMA mode and a GSM mode and a call processing method for the dual mode phone.

In accordance with an aspect of the present invention, the above and other objects are accomplished by a dual mode mobile handset. The dual mode mobile handset includes a first transceiver for receiving and transmitting a first communication mode call; a first controller for assigning a first communication mode call identifier to a call received through the first communication mode transceiver; a second transceiver for receiving and transmitting a second communication mode call; a second controller for assigning a second communication mode call identifier to a call received through the second communication mode transceiver; a user interface module for selectively activating one of call processing applications for the first and second communication mode calls on the basis of the call identifier assigned to the received call; and an inter-process communication module for matching one of the first and second controller to the user interface module.

In accordance with another aspect of the present invention, the above and other objects are accomplished by a call processing method for a dual mode mobile handset having first and second communication modules. The call processing method for a dual mode mobile handset includes receiving a call; assigning a call identifier to the call according to a communication mode which is determined by whether the call is received through the first or second communication module; and activating one of two communication mode call processing applications according to on the basis of the cal identifier assigned to the call.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
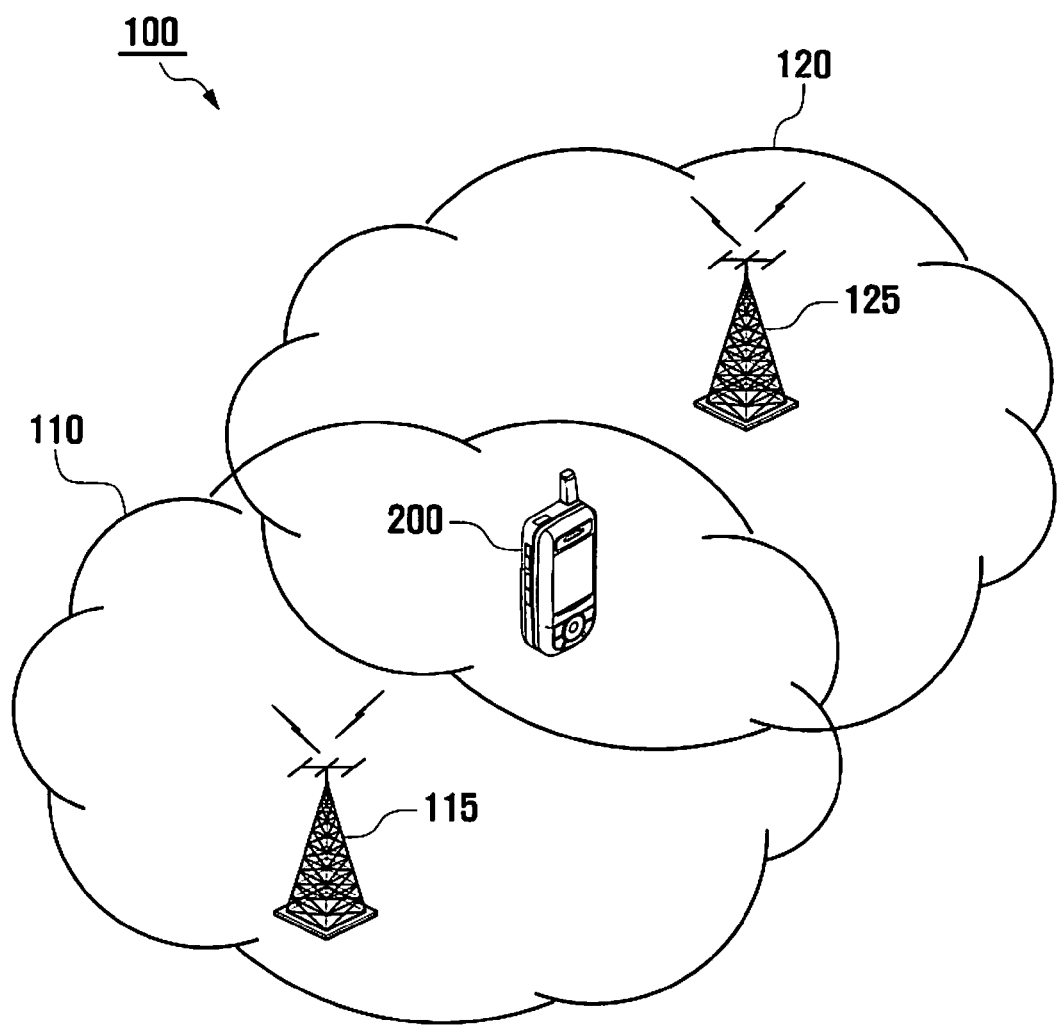
FIG. 1 is a schematic diagram illustrating a communication environment in which two different communication systems coexist.

FIG. 1 is a schematic diagram illustrating a communication environment in which two different communication systems coexist.

In FIG. 1, the communication environment 100 includes a CDMA cell 110 defined by a radio coverage of a CDMA base station 115 for providing CDMA service and a GSM cell 120 defined by a radio coverage of a GSM base station 125 for providing GSM service, and a dual mode mobile handset 200 is located in an area where the CDMA cell 110 and GSM cell 120 are overlapped.

The dual mode mobile handset 200 is implemented with two communication modules for processing both CDMA and GSM signals.

Figure 2:
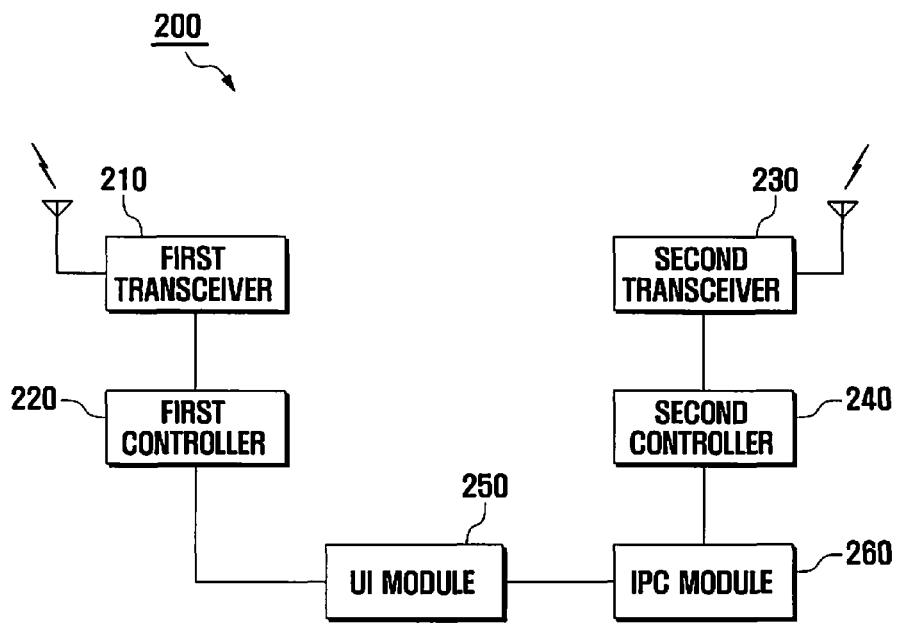
FIG. 2 is a block diagram illustrating a configuration of a dual mode mobile handset according to an exemplary embodiment of the present invention.

FIG. 2 is a block diagram illustrating a configuration of a dual mode mobile handset according to an exemplary embodiment of the present invention.

Referring to FIG. 2, the dual mode mobile handset 200 includes a first transceiver 210 for processing CDMA signals, a first controller 220 for assigning an identifier to the CDMA call received through the first transceiver 210, a second transceiver 230 for processing GSM signals, a second controller 240 for assigning an identifier to a GSM call received through the second transceiver 230, a User Interface (UI) module 250 for enabling a call processing application corresponding to the identifier assigned to a call, and an Inter-Process Communication (IPC) module 260 for matching the UI module 250 and one of the first and second controllers 220 and 240.

One of the first and second controllers 220 and 240 can be a primary controller and the other can be a secondary controller. The primary and secondary controllers can be implemented such that the primary controller is directly connected to the UI module 250 and the secondary controller is connected to the UI module 250 via the IPC module. The primary and secondary controllers can be exchanged in their roles. For example, when a CDMA call is received, the first controller 220 becomes the primary controller and the second controller 240 becomes the secondary controller such that the first controller 220 directly transports the CDMA call to the UI module 250. In contrast, when GSM call is received, the second controller 240 becomes the primary controller and the first controller 220 becomes the secondary controller such that the second controller 240 directly transports the GSM call to the UI module 250.

Although the second controller 240 is depicted as connected to the IPC module 260 in this exemplary embodiment, it can be obviously understood by those skilled in the art that the present invention may be modified in various forms. For example, the second controller 240 can be the primary controller. In this case, the second controller 240 is directly connected to the UI module 250 and the first controller 220 is connected to the UI module 250 through the IPC module 260. Preferably, the first and second controller 220 and 240 are Mobile Station Modem (MSM) chips designed for CDMA and GSM, respectively.

The first controller 220 assigns, if a CDMA call is received, a dedicated CDMA call identifier to the CDMA call and transports information on the CDMA call to the UI module 250 together with the assigned call identifier.

The second controller 240 assigns, if a GSM call is received, one of the call identifiers, except for the dedicated CDMA call identifier, to the GSM call and transports information on the GSM call to the UI module 250 together with the assigned call identifier. The second controller 240 can assign the call identifier in a sequential order. For example, if call identifiers from 1 to 3 have been assigned, the next order call identifier 4 is assigned for a current call.

In order to store the call identifiers, the dual mode mobile handset 100 can further include a storage module (not shown).

The UI module 250 recognizes a type of the call by determining whether the call is a CDMA call on the basis of the call identifier attached to the call, and activates an application appropriate for the type of the call.

Assuming that the dedicated CDMA call identifier is UI_CALL_ID_MAX, the UI module 250 distinguishes the type of the call as follows:

```
If (call id == UI_CALL_ID_MAX)
    CDMA call process;
Else
    GSM call process;
```

Figure 3:
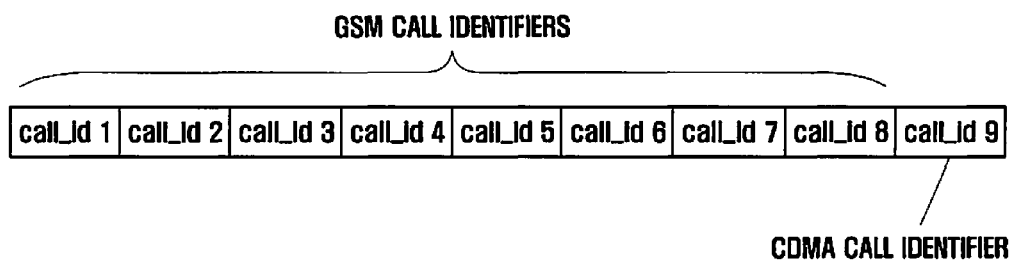
FIG. 3 is a diagram illustrating call identifiers for use in the dual mode mobile handset according to an exemplary embodiment of the present invention.

FIG. 3 is a diagram illustrating call identifiers for use in the dual mode mobile handset according to an exemplary embodiment of the present invention.

If there are nine (9) available call identifiers, one number, for example call_id9, is designated as the dedicated CDMA call identifier and remaining call identifier numbers call_id1 to call_id8 are used for GSM calls.

The reason why one call identifier is designated for the CDMA and multiple call identifiers are designated for the GSM is because the CDMA does not support a multi-party call, while the GSM supports the multi-party call.

If the call identifier of the received call is call_id9, the UI module 250 determines that the call is the CDMA call and activates the CDMA application for processing the CDMA call. In this case, the UI module 250 may notify the user that the currently received call is the CDMA call.

If the call identifier of the received call is not call_id9, the UI module 250 determines that the call is the GSM call, and activates the GSM application for processing the GSM call. In this case, the UI module 250 may notify the user that the currently received call is the GSM call.

For example, the UI module 250 can display a notification message such as "GSM mode" and "CDMA mode" for notifying the user of the received call type.

The dual mode mobile handset 200 further includes (not shown) at least one of an input module including keypad and touch panel, a memory slot for attaching external storage media such as memory card, an internal memory, a camera module, a broadcast receiver module, an audio output means such as speaker, an audio input means such as microphone, a data communication slot for exchanging data with an external device, a power port for charging the mobile handset, and a digital content playback module such as a MPEG-1 audio layer 3 (MP3) module.

Although all the types of digital devices that can be converged in the mobile handset are not described, other digital modules that can be connected to the mobile handset and their equivalents can be integrated into the mobile handset.

Figure 4:
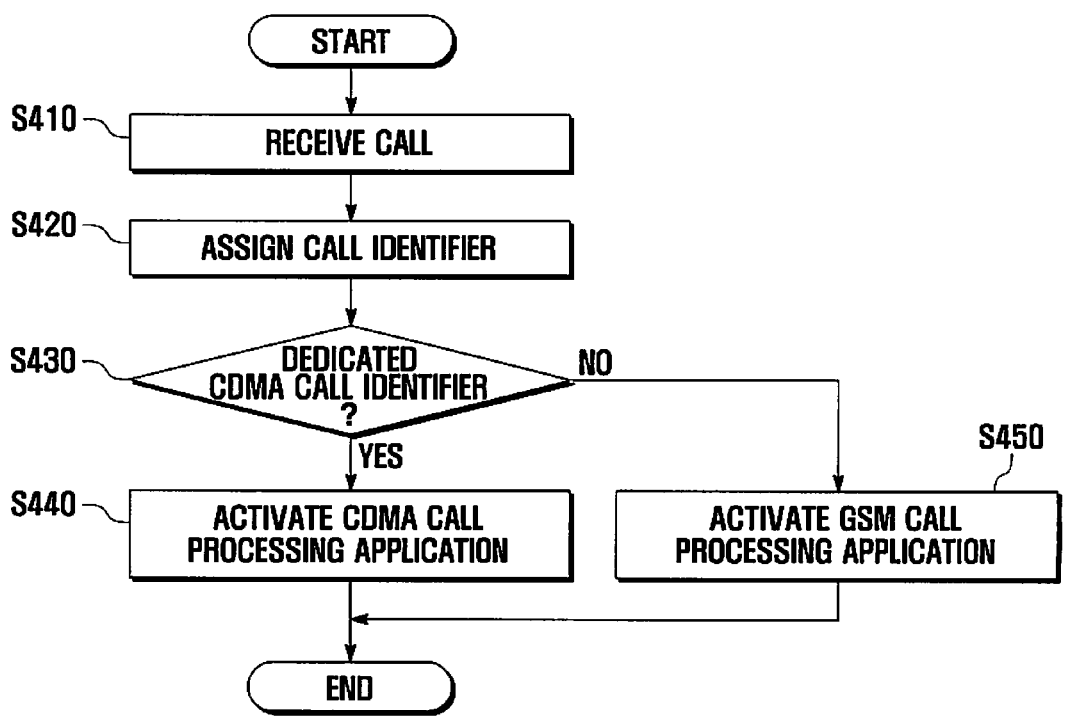
FIG. 4 is a flowchart illustrating a call processing method for a dual mode mobile handset according to an exemplary embodiment of the present invention.

FIG. 4 is a flowchart illustrating a call processing method for a dual mode mobile handset according to an exemplary embodiment of the present invention.

Referring to FIG. 4, in the call processing method for a dual mode mobile handset according to an exemplary embodiment of the present invention, the dual mode mobile handset 200 detects that a call is received, in step S410, and assigns a call identifier to the call according to a type of the call, in step S420. Next, a UI module 250 performs call processing on a basis of the call identifier, in steps S430 to S450.

At step S410, if a call is received, one of the primary and secondary controllers, which are on a call signal path, assigns a call identifier to the call.

For example, assuming that the first controller 220, i.e. the CDMA controller, is the primary controller and the secondary controller 240, i.e. the GSM controller 240, is the secondary controller, the primary controller 220 assigns, when a CDMA call is received, a dedicated CDMA identifier to the CDMA call. In such configuration, if a GSM call is received, the secondary controller 240 assigns one call identifier among all the call identifiers with the exception of the dedicated CDMA call identifier.

In a case where the second controller 240 is configured as the primary controller and a CDMA call is received, the secondary controller assigns the dedicated CDMA call identifier to the call. Also, if the second controller 240 is configured as the primary controller and a GSM call is received, the primary controller assigns a GSM call identifier to the GSM call.

At step S430, the UI module 250 determines whether the call identifier assigned to the received call is the dedicated CDMA call identifier. If the call identifier is the dedicated CDMA call identifier, the UI module 250 activates a CDMA application for processing the CDMA call, in step S440. In contrast, if the call identifier is a GSM call identifier, the UI module 250 activates a GSM application for processing the GSM call, in step S450. In this manner, the UI module 250 can switch between the CDMA and GSM applications for processing the CDMA and GSM call.

As described above, a dual mode mobile handset and a call processing method for the dual mode mobile handset according to the present invention are implemented to receive CDMA and GSM calls through separate signal lines and process the CDMA and GSM signals using different applications, thereby adaptively receiving the CDMA and GSM calls in a communication environment in which two communication systems coexist.

Also, the dual mode mobile handset and a call processing method for the dual mode mobile handset according to the present invention are implemented such that CDMA and GSM modules are simultaneously in standby mode, whereby the mobile handset can receive the GSM and CDMA calls at anytime any system service area.

Also, the dual mode mobile handset and a call processing method for the dual mode mobile handset according to the present invention internally assign a call identifier to a received call and configure a call processing procedure on the basis of the call identifier, resulting in effective multi-mode communication.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A dual mode mobile handset comprising:
a first transceiver for receiving and transmitting a first communication mode call;
a first controller for assigning a first communication mode call identifier to a call received through the first communication mode transceiver;
a second transceiver for receiving and transmitting a second communication mode call;
a second controller for assigning a second communication mode call identifier to a call received through the second communication mode transceiver;
a user interface module for selectively activating one of call processing applications for the first and second communication mode calls on a basis of the call identifier assigned to the received call; and
an inter-process communication module for matching one of the first and second controllers to the user interface module.

2. The dual mode mobile handset of claim 1, wherein one of the first and second controllers is a primary controller and the other is a secondary controller.

3. The dual mode mobile handset of claim 2, wherein the primary controller is directly connected to the user interface module and the secondary controller is connected to the user interface via the inter-process communication module.

4. The dual mode mobile handset of claim 2, wherein if a first communication mode call is received through the first transceiver, the first controller assigns a dedicated first communication mode call identifier to the first communication mode call and transports call information containing an assigned call identifier to the user interface module.

5. The dual mode mobile handset of claim 4, wherein the user interface module determines a communication mode on a basis of whether the call identifier assigned to the received call is the dedicated first communication mode call identifier.

6. The dual mode mobile hand set of claim 5, wherein if the call identifier assigned to the received call is the dedicated first communication mode call identifier, the user interface module determines the received call is the first communication mode call and activates a call processing application for processing the first communication mode call.

7. The dual mode mobile handset of claim 5, wherein if the call identifier assigned to the received call is not the dedicated first communication mode call identifier, the user interface module determines the received call is the second communication mode call and activates a call processing application for processing the second communication mode call.

8. The dual mode mobile handset of claim 2, wherein if a second communication mode call is received through the second transceiver, the second controller assigns one of a plurality of second communication call identifiers to the second communication mode call and transports call information containing the assigned call identifier to the user interface module.

9. The dual mode mobile handset of claim 8, wherein the user interface module determines a communication mode on a basis of whether the call identifier assigned to the received call is the dedicated first communication mode call identifier.

10. The dual mode mobile hand set of claim 9, wherein if the call identifier assigned to the received call is the dedicated first communication mode call identifier, the user interface module determines the received call is the first communication mode call and activates a call processing application for processing the first communication mode call.

11. The dual mode mobile handset of claim 9, wherein if the call identifier assigned to the received call is not the dedicated first communication mode call identifier, the user interface module determines the received call is the second communication mode call and activates a call processing application for processing the second communication mode call.

12. A call processing method for a dual mode mobile handset having first and second communication modules, the method comprising:
receiving a call;
assigning a call identifier to the call according to a communication mode which is determined by whether the call is received through the first or second communication module; and activating one of two communication mode call processing applications on a basis of the call identifier assigned to the call, wherein activating one of two communication mode call processing applications comprises:

determining whether the call identifier is a dedicated first call communication mode identifier, activating, if the call identifier is the dedicated first call communication mode identifier, a first communication mode call processing application, and activating, if the call identifier is not the dedicated first call communication mode identifier, a second communication mode call processing application.

13. The call processing method of claim 12, wherein assigning a call identifier comprises:

determining whether the call is received through the first communication module; and assigning, if the call is received through the first communication module, the dedicated first call communication mode identifier if the call is received through the first communication module.

14. The call processing method of claim 12, wherein assigning a call identifier comprises:

determining whether the call is received through the second communication module; and assigning, if the call is received through the second communication module, one of a plurality of second communication mode call identifiers if the call is received through the second communication module.

* * * * *